Jan. 5, 1937. J. P. WATSON 2,066,498
GUNFIRE CONTROL APPARATUS
Filed June 14, 1932
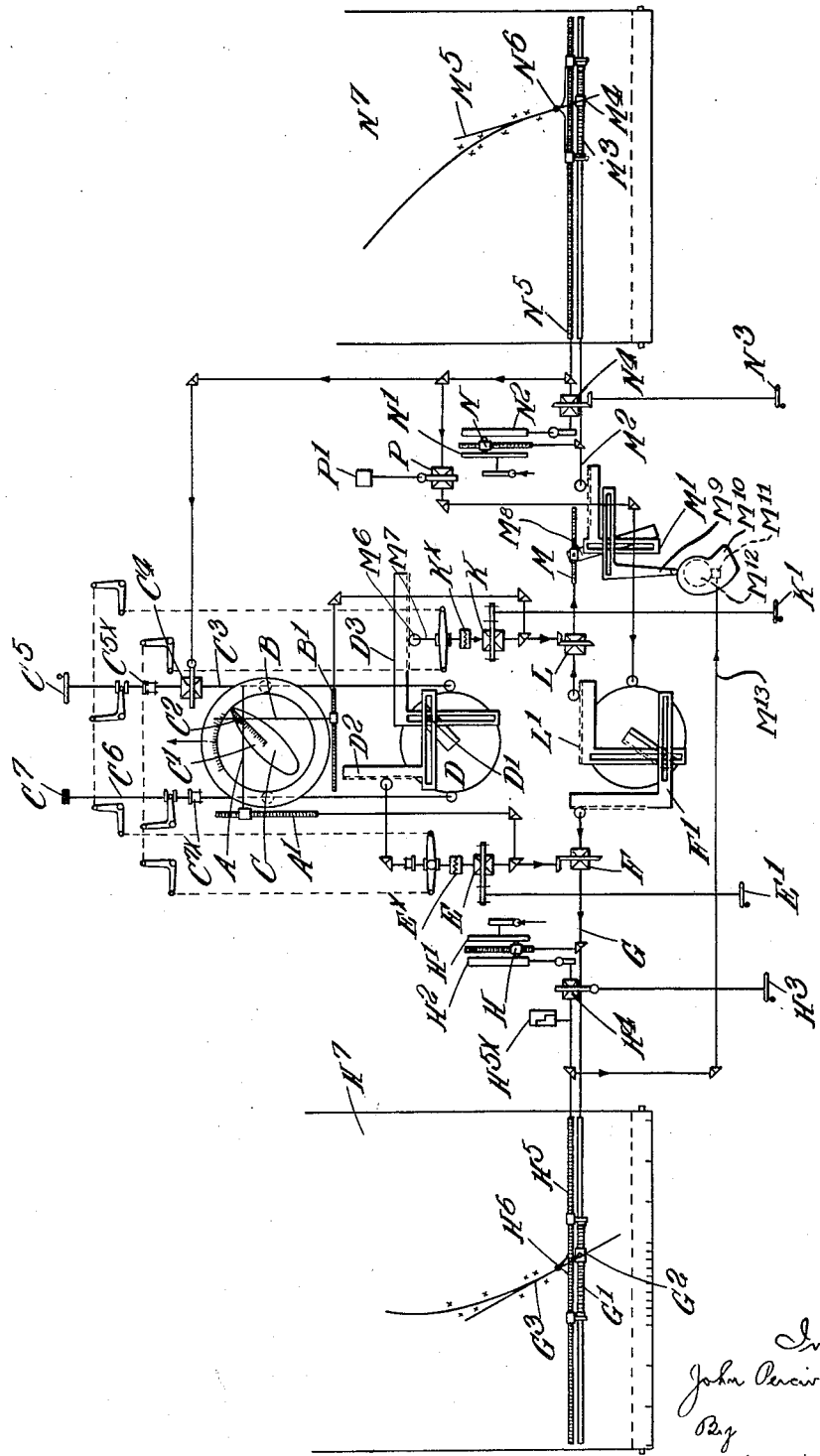

Patented Jan. 5, 1937

2,066,498

UNITED STATES PATENT OFFICE 2,066,498

GUNFIRE CONTROL APPARATUS

John Percival Watson, Broadway, Westminster, England, assignor to Vickers-Armstrongs Limited, Westminster, England, a British company Application June 14, 1932, Serial No. 617,071
In Great Britain June 20, 1931

16 Claims. (Cl. 235—61.5)

This invention relates to gun fire control apparatus for use on a ship or other moving platform and has for its chief object to provide an improved device for determining the course and speed of a moving target from the observed changes of range and bearing of the target, such changes being, of course, due to the movements of the target and the movements of "own" ship when they are moving at different speeds and on different courses.

According to the present invention the device comprises means whereby the rate of change of range and the rate of change of bearing determined from averagers, plotters or other devices, have deducted therefrom the rates due to the movement of "own" ship, and members moved in accordance with the resultants (i. e. the rates due only to the movement of the target) cause to move over a target dial, wires, grids or the like the point of intersection of which indicates the course and speed of the target.

In order that the said invention may be clearly understood and readily carried into effect, the same will now be described more fully with reference to the accompanying drawing which shows diagrammatically a form of apparatus according to the invention.

A, B represent the aforesaid wires or grids movable at right angles to each other over the face of a target dial C which carries the outline of a ship (representing the target) and which is provided with a target speed scale C' running longitudinally of the ship outline and with a movable target speed pointer $C^2$. The wire A is herein termed the range rate wire and the wire B is termed the linear bearing rate wire. The dial C is operated by a target inclination shaft $C^3$ (operated through a differential gear $C^4$ from a target inclination handle or knob $C^5$ and a shaft $N^5$ hereinafter referred to) and the pointer $C^2$ is operated by a target speed shaft $C^6$ operated by a target speed handle or knob $C^7$. The target inclination is the target course relative to the line of sight. The shaft $C^3$ also drives the rotary portion or disc of a target "analyzer" D (the details of which are explained in the specification of English Patent No. 381,147) and the shaft $C^6$ operates the crank pin D' of this analyzer, the result being that this crank pin occupies a position corresponding radially and angularly to the position of the pointer $C^2$. The handles or knobs $C^5$, $C^7$ are operated by hand to cause the pointer $C^2$ to coincide with the point of intersection of the wires A and B and in so doing the sliding elements $D^2$, $D^3$ of the target analyzer are properly set. The sliding element $D^2$ whose position is a measure of the rate of change of range due to the movement of the target operates through a differential gear E a screw-threaded shaft A' carrying a nut which supports the range rate wire A, the differential gear E being controlled by a range rate tuning handle E'. The total movement of the shaft A' is combined by means of a differential gear F with movement derived from the range rate element F' of "own" ship "analyzer" (similar to the target "analyzer") and the resultant movement of a shaft G is in accordance with the sum of the two rates of change, i. e. the rate of change of range due to the known movements of "own" ship and the rate of change of range due to the target movements to be ascertained. The shaft G adjusts the position of a ball carrier H relating to a variable speed gear comprising a disc H' driven at a constant speed and a roller $H^2$ driven from the disc through the balls of the carrier H in accordance with the changing range. The movement of the roller $H^2$ is combined with the movement of a range tuning handle $H^3$ by means of a differential gear $H^4$ and a screw-threaded shaft $H^5$ is operated in accordance with the resultant which is the range of the moment. The shaft $H^5$ drives a range transmitter $H^{5x}$. The outer end of this shaft $H^5$ is screw-threaded and engaged with the holder of a pencil $H^6$ which follows range indications marked on a range plotter $H^7$ from a range finder, the pencil being caused to trace a curve of average range. The aforesaid shaft G has splined thereto a screw-threaded sleeve $G^1$ which is prevented from moving longitudinally with respect to the pencil holder and operates a non-rotary nut $G^2$ carrying a cursor $G^3$ pivoted around the holder of the pencil $H^6$, the position of this cursor tangential to the curve of average range representing the rate of change of the range. In this manner the correct range rate can be quickly found and set by means of the range rate tuning handle E'. The inclination of the plot is proportional to the rate of change of range due to the movement of the target and "own" ship, but the rate component derived from "own" ship analyzer is not communicated to the range rate wire A which only receives its motion from the range rate tuning handle E' and the target analyzer D.

The sliding element $D^3$ of the target "analyzer" D (the movement of this element being a measure of the rate of change of linear bearing due to the movement of the target) operates a screw-threaded shaft B' through a differential gear K controlled by a bearing rate tuning handle K'. This screw-threaded shaft moves the linear bearing rate wire B and the movement of the said shaft is combined by means of a differential gear L with movement derived from the linear bearing rate element L' of "own" ship "analyzer" and the resultant movement of a shaft M is in accordance with the sum of the two linear bearing rates. This resultant movement is combined with the range movement of the aforesaid shaft $H^5$ in order to obtain the corresponding angular bearing rate, by means of a suitable mechanism M' which moves a shaft $M^2$ in accordance with this angular bearing rate. The sliding element $D^3$ rotates the screw M through gear wheel $M^6$, shaft $M^7$, clutch $K^x$ and differentials K and L. The screw M operates the radius arm $M^8$ of a slider mechanism $M^1$, the slider mechanism comprising radius bar $M^8$ and sliders $M^1$, $M^9$. The slider $M^9$ is moved constantly by a cam $M^{10}$ rotated by a worm $M^{11}$ and gear wheel $M^{12}$, the worm $M^{11}$ being rotated by a shaft $M^{13}$ driven with the screw $H^5$ at a rate proportional to the present range. The slider $M^9$ thus imparts a movement to the slider $M^1$, the amount of movement being dependent upon the movement of the radius bar $M^8$. The slider $M^1$ therefore receives the resultant of the movements of $M^8$ and $M^9$ which, of course, is proportional to the angular bearing rate, since the latter depends upon the range and linear bearing. This shaft $M^2$ adjusts the position of a ball carrier N relating to a variable speed gear comprising a disc N' driven at a constant speed and a roller $N^2$ driven from the disc through the balls of the carrier in accordance with the changing bearing angles. The movement of the roller $N^2$ is combined with the movement of a bearing tuning handle $N^3$ by means of a differential gear $N^4$ and a screw-threaded shaft $N^5$ is driven in accordance with the resultant. This shaft $N^5$ moves a pencil $N^6$ which follows bearing angle indications marked on a bearing plotter $N^7$ from a bearing finder, the pencil being caused to trace a curve of average bearing. The pencils $H^6$ and $N^6$ are moved transversely across the plotter by the mechanism described, and are adjusted until they move at a rate to maintain the desired courses. The plotters $H^7$ and $N^7$ are moved (vertically with respect to the drawing) at a rate proportional to time. The aforesaid shaft $M^2$ has a screw-threaded portion $M^3$ which operates a nut $M^4$ carrying a cursor $M^5$ pivoted around the holder of the pencil $N^6$, the position of this cursor tangential to the curve of average bearing representing the rate of change of the bearing. In this manner the correct bearing rate can be quickly found and set by means of the bearing rate tuning handle K'. The rate of change of bearing is due to the movement of the target and "own" ship, but the rate component derived from "own" ship analyzer is not communicated to the bearing rate wire B which only receives its motion from the bearing rate tuning handle K' and the target analyzer D. The shaft $N^5$ drives one element of the aforesaid differential gear $C^4$ and also one element of another differential gear P by which the movement of the said shaft is added to the movement of a yaw receiver P' and the resultant used for adjusting the disc of "own" ship "analyzer"; the crank pin of this analyzer is adjusted in accordance with the known speed of "own" ship. The yaw receiver comprises an electric motor connected electrically to the ship's gyro compass and controlled therefrom.

Suitable clutches $E^x$ and $K^x$ are provided in the gearing between the aforesaid sliding elements $D^2$ and $D^3$ of the target "analyzer" and the differential gears E and K for the purpose of enabling the handles or knobs $C^5$ and $C^7$ to be adjusted to bring the pointer $C^2$ into coincidence with the point of intersection of the wires A and B without disturbing the previous range and bearing rates set on the shafts G and M. These clutches may be interconnected by bell crank levers and links as indicated and may be operated by pulling and pushing the handles or knobs $C^5$ and $C^7$, suitable sliding couplings $C^{5x}$ and $C^{7x}$ being provided in the shafts operated thereby so as to maintain operative connection at all times. Alternatively the clutches may be of the electromagnetic type and brought into and placed out of operation by the sliding movements of the knobs $C^5$ and $C^7$.

In employing the apparatus in practice it is first necessary for operators in the control positions on the ship to cause ranges to be plotted on the plotter $H^7$ and bearings to be plotted on the plotter $N^7$, which ranges and bearings are due to the effects of the combined movements of "target" and "own" ships. Another operator will then set the "own" ship's course and speed from observed data on the crank pin controlling the sliders $L^1$, $F^1$. The angular disposition of the bar $G^3$ in relation to its zero position will at this time indicate or will be a measure of the rate of change of range due to the movement of the "own" ship alone, since its angular disposition will be due solely to the "own" ship speed setting on the crank pin controlling the slider $F^1$. The range tuning handle $H^3$ will now be operated to move the cursor bar $G^3$ bodily without varying its angular disposition so that the bar remains parallel to its initial position. The bar $G^3$ will be moved in this way until the pencil $H^6$ is on the curve indicated by the points plotted on the plotter $H^7$. Now the range plotting on the plotter $H^7$ corresponds to ranges due to the combined movements of both the target and "own" ship. The angular disposition of the tangent to the curve of these plottings will therefore indicate or will be a measure of the rate of change of range due to such combined movements. Therefore, the angular difference between the position of the cursor bar $G^3$ and the position of the said tangent will correspondingly indicate or will be a measure of the rate of change of range due solely to the movement of the target. It will therefore be apparent that adjustment of the handle $E^1$ (which adjusts the range rate wire A, operates the shaft G which in turn adjusts the member H of the variable speed device, and actuates the member $G^1$ and block $G^2$ to vary the angle of the cursor bar) to move the bar $G^3$ through the angular difference referred to will bring the cursor bar into true tangential relation with the curve referred to, and since this difference is proportional solely to the rate of change of range due to the movement of the target ship, the range rate wire A will be actuated to indicate the rate of change of range due to target course and speed.

In an exactly similar manner the bearing cursor bar $M^5$ will be adjusted by the operation of the handle $N^3$ and thereafter by operation of the handle $K^1$ to bring the cursor bar into true tangential relation with the curve indicated by the points plotted on the plotter $N^7$, and to maintain it in such relation, whereby the linear bearing rate cross wire B will be actuated in accordance with the rate of change of linear bearing due to target course and speed. The sliders D², D³, are adjusted initially (after disengaging the clutches Eˣ, Kˣ) in accordance with the target course and speed indicated by the wires A, B, by moving the pointer C² into coincidence with the point of intersection of the wires A, B, by means of the handles C⁵, C⁷, whereby the crank pin D¹ is similarly adjusted and imparts the appropriate adjustment to the sliders D², D³. The slider D² actuates the shaft G so as to vary the speed at which the member H² of the variable speed gear is driven in accordance with the changing rate so as to cause the pencil H⁶ to trace out a curve of average range, or in other words to maintain the pencil along the curve indicated by the plotted points on the plotter H⁷ after the pencil has been initially set on the curve. The slider D² also actuates the parts G, G¹, G², to vary the angular disposition of the bar G³ to maintain it in tangential relation to the range curve. Similarly, the bearing slider D³ will vary the rate at which the member N² is driven so as to maintain the pencil N⁶ on the bearing curve indicated by the point plotted on the plotter N⁷, and will vary the angular disposition of the bar M⁵.

The sliders D², D³ are also connected to any suitable mechanism (not shown) which for example predicts or corrects target range and bearing due to target course and speed.

The sliders F¹, L¹ are likewise connected to some mechanism (not shown) which for example predicts or corrects range and bearing due to "own" ship movement.

When the mechanism has been adjusted as above described the analyzers will, if the target course and speed and "own" ship speed remain constant, (1) automatically adjust the wires A, B; (2) cause the button or pointer C² to automatically maintain coincidence with the point of intersection of the wires A, B; and (3) will maintain the cursor bars in tangential relation to the curves referred to and the pencils H⁶, N⁶, on said curves.

An operator will, however, constantly attend to the handles C⁷, C⁵, so as to maintain the button or pointer C² in coincidence with the point of intersection when target course or speed varies.

Any suitable means other than those hereinbefore described may be employed for determining the rates of change of range and bearing for effecting the adjustment of the range rate wire A and the linear bearing rate wire B.

What I claim and desire to secure by Letters Patent of the United States is:—

1. For use in gun fire control apparatus on a ship or other moving platform, a device comprising an indicator which indicates a curve of ascertained rate of change of a measurement which rate of change is due to the combined movements of a target ship and of own ship, a cursor bar adjustable in relation to said curve, means adjusted according to the rate of change of said measurement due solely to own ship's movements and which means move the cursor bar in accordance with said rate of change due solely to own ship's movement, a target rate indicating device, and additional means for applying further movements to the cursor bar to bring it into tangential relation with this curve which additional means simultaneously actuate the target rate indicating device in accordance with said further movements.

2. For use in gun fire control apparatus on a ship or other moving platform, a device comprising a range rate indicator which indicates a curve of ascertained rate of change of range due to the combined movements of a target ship and of own ship, a bearing rate indicator which indicates a curve of ascertained rate of change of bearing due to the combined movements of a target ship and of own ship, means which are adjusted in accordance with own ship's course and speed, a range element co-operating with the range rate indicator and actuated by said means in accordance with rate of change of range due to own ship's movements, a bearing element co-operating with the bearing rate indicator and actuated by said means in accordance with rate of change of bearing due to own ship's movements, means to apply additional movement to the range element and to the bearing element to bring said elements into tangential relationship with said curves so that the total movements of said elements are in accordance with rate of change of range and of bearing due to the combined movements of the target ship and own ship, a target range rate indicating member adjusted by the means for applying additional movement to the range element, and a target bearing rate indicating member adjusted by the means for applying additional movements to the bearing element.

3. For use in gun fire control apparatus on a ship or other moving platform, a device as in claim 2 wherein the target range indicating member and target bearing indicating member are arranged adjacent to each other and are arranged to intersect and to move in different directions so that their point of intersection is an indication of target course and speed.

4. For use in gun fire control apparatus on a ship or other moving platform, a device comprising a range rate indicator which indicates a curve of ascertained rate of change of range which is due to the combined movements of a target ship and of own ship, a range rate cursor bar, means for varying the angular disposition of the range rate cursor bar in accordance with change of range due to own ship's movement, means to apply additional movements to the range rate cursor bar to bring it into tangential relation with the curve indicated by the range rate indicator whereby the total movement applied to the range rate cursor bar will be in accordance with the rate of change of range due to the combined movements of the target ship and of own ship, a target range rate indicator member, and means to transmit the additional movements applied to the cursor bar to the target range rate member whereby the latter is moved in accordance with rate of change of range due to the target ship alone, a bearing rate indicator which indicates a curve of ascertained rate of change of bearing which is due to the combined movements of the target ship and of own ship, a bearing rate cursor bar, means to vary the angular disposition of the bearing rate cursor bar in accordance with rate of change of bearing due to movements of own ship alone, means to apply additional movements to the cursor bar to bring it into tangential relation with the curve indicated by the bearing rate indicator, a target bearing rate indicating member, and means to transmit the additional movements applied to the bearing rate cursor bar to the target bearing rate indicating member.

5. A device as in claim 4, wherein the target range member and target bearing member are arranged adjacent to each other and to intersect and to move in different directions so that their point of intersection is an indication of target course and speed.

6. A device as in claim 4, wherein the means for transmitting the additional movements applied to the bearing rate cursor bar to the target bearing rate indicating member include means for converting angular bearing rate to linear bearing rate so as to move the target bearing range indicating member in accordance with variation of linear bearing rate due to movements of the target ship.

7. A device as in claim 4 wherein the cursor bars are pivotally mounted and said device has means whereby the cursor bars can be moved bodily so as to remain parallel with respect to their initial positions, and means to move the cursor bars about their pivots, which latter means also actuate the target range rate indicating member and the target bearing rate indicating member.

8. For use in gun fire control apparatus on a ship or other moving platform, a device comprising a range rate indicator which indicates a curve of ascertained rate of change of range which is due to the combined movements of a target ship and of own ship, a bearing rate indicator which indicates a curve of ascertained rate of change of bearing which is due to the combined movements of target ship and of own ship, an analyzer which is adjusted in accordance with ascertained course and speed of own ship, a range rate cursor bar, means to transfer movements to the range rate cursor bar from the analyzer to vary the angular disposition of the bar in accordance with the change of range due to own ship's movements alone, means to apply additional movements to the range rate cursor bar to bring it into tangential relation with the curve indicated by the range rate indicator whereby the total movement applied to the range rate cursor bar will be in accordance with rate of change of range due to the combined movements of the target and of own ship, a target range rate indicating member, and means to transmit the additional movements applied to the cursor bar also to the target range rate indicating member whereby the latter is moved in accordance with rate of change of range due to the target ship alone, a bearing rate cursor bar, means to vary the angular disposition of the cursor bar by transmitting movements thereto from the analyzer in accordance with rate of change of bearing due to movements of own ship alone, means to apply additional movement to the bearing rate cursor bar to bring it into tangential relation with the curve indicated by the bearing rate indicator, a target bearing rate indicating member, and means to transmit additional movements applied to the bearing rate cursor bar to the target bearing rate indicating member whereby the latter is moved in accordance with rate of change of bearing due to the target ship alone.

9. For use in gunfire control apparatus on a ship or other moving platform, a device comprising a range rate indicator which indicates a curve of ascertained rate of change of range due to the combined movements of a target ship and of own ship, a bearing rate indicator which indicates a curve of ascertained rate of change of bearing due to the combined movements of a target ship and of own ship, an analyzer which is adjusted in accordance with own ship course and speed, a range element co-operating with the range rate indicator and actuated by said analyzer in accordance with rate of change of range due to own ship's movements, a bearing element co-operating with the bearing rate indicator and actuated by said analyzer in accordance with rate of change of bearing due to own ship's movement, means to apply additional movements to the range element to bring it into tangential relationship with the range curve so that the total movements of said range element are in accordance with rate of change of range due to the combined movements of target ship and own ship, means to apply additional movements to the bearing element to bring it into tangential relationship with the bearing curve so that the total movements of said bearing element are in accordance with rate of change of bearing due to the combined movements of target ship and own ship, a target range rate indicator member adjusted so that it indicates target speed by the means for applying additional movements to the range element, and a target bearing range indicating member adjusted so that it indicates target bearing by the means for applying additional movements to the bearing element.

10. Apparatus as in claim 9, having a second analyzer which is operated in accordance with target course and speed, means to co-operate with the target range rate indicating member and target bearing rate indicating member and with said second analyzer whereby the latter can be adjusted in accordance with the indication of target course and speed given by said members, and variable speed means for actuating the range rate element and bearing rate element which variable speed means are adjusted by connection to both said analyzers.

11. A device as in claim 9, having a second analyzer which is operated in accordance with target course and speed, means to co-operate with the target range rate indicating member and target bearing rate indicator member and with said second analyzer whereby the latter can be adjusted in accordance with the indication of target course and speed given by said members, variable speed means for continuously moving the said range and bearing elements without varying their angular disposition, and which variable speed means are adjusted by connection to the said second analyzer.

12. For use in gunfire control apparatus on a ship or other moving platform a device comprising a range plotter on which ascertained ranges due to the combined movements of a target ship and of own ship are plotted to indicate a range curve, a bearing plotter on which ascertained bearings due to the combined movements of target ship and of own ship are plotted to indicate a bearing curve, an analyzer which is adjusted in accordance with own ship course and speed, a range cursor bar co-operating with the range plotter, a pivotal support for the range cursor bar, connections between said cursor bar and the analyzer whereby the angular disposition of the cursor bar is varied in accordance with rate of change of range due to own ship's speed, a manually adjustable member for actuating said pivotal support so as to move the cursor bar bodily without varying its inclination, a manually adjustable member for varying the inclination of the cursor bar in addition to the movement imparted to the cursor bar from the analyzer, a target range rate indicator member, means for transmitting movement to said member from the second mentioned manually adjustable member, a bearing rate cursor bar, a pivotal support for said bearing rate cursor bar, a manually adjustable member for imparting movement to the bearing rate cursor bar pivotal support so as to move the atter bodily without varying its inclination, means for transmitting movement from the analyzer to the bearing rate cursor bar for varying the inclination of the cursor bar in accordance with rate of change of bearing due to own ship's course said transmitting means including a device for converting linear bearing rate movement to angular bearing rate movement, a manually operable member for applying additional movement to the bearing rate cursor bar through said device for varying the inclination of the bearing rate cursor bar, a target linear bearing rate indicating member, and means for transmitting movement from the last mentioned manually operable member to the target linear bearing rate indicating member, the arrangement being such that the cursor bars are adjusted for inclination from the analyzer and are moved bodily until their axes about which they pivot coincide with the curves on the plotters whereupon the differences between their positions and the tangents to the curves at said axes will be an indication of the range and bearing rates due to the movement of the target ship alone whereupon the cursor bars will be moved through said differences until they are tangential to said curves and simultaneously the target range rate indicating member and target linear bearing rate indicating member will both be adjusted according to said respective differences.

13. For use in gunfire control apparatus on a ship or other moving platform, a device comprising a range plotter on which ascertained ranges due to the combined movements of a target ship and of own ship are plotted to indicate a range curve, a bearing plotter on which ascertained bearings due to the combined movements of target ship and of own ship are plotted to indicate a bearing curve, an own ship analyzer which is adjusted in accordance with own ship course and speed, a range rate cursor bar co-operating with the range plotter, a support on which the range rate cursor bar is pivotally mounted, connections between said cursor bar and the analyzer whereby the angular disposition of the cursor bar is varied according to rate of change of range due to own ship's speed, a variable speed gear for driving the pivotal support so as to move the cursor bar bodily without varying its inclination, a manually adjustable member for actuating said support so as to impart additional movements to the cursor bar without varying its inclination, a manually adjustable member for varying the inclination of the cursor bar in addition to the movement imparted to the cursor bar from the analyzer, and for simultaneously varying the output speed of said variable speed gear, a target range rate indicator member, means for transmitting movement to said target range rate indicating member from the second mentioned manually adjusting device, a bearing rate cursor bar, a support on which said bearing rate cursor bar is pivotally mounted, a bearing rate variable speed gear for actuating the bearing rate cursor bar support so as to move the bearing rate cursor bar bodily without varying its inclination, a manually adjustable member for imparting additional movement to the bearing rate cursor bar support, means for transmitting movement from the analyzer to the cursor bar for varying the inclination of the cursor bar in accordance with rate of change of bearing due to own ship's course said transmitting means including a device for converting linear bearing rate movement to angular bearing rate movement, a manually operable member for applying additional movement to the bearing rate cursor bar through said device for varying the inclination of the cursor bar, a target linear bearing rate indicating member, and means for transmitting movement from the last named manually operable member to the target linear bearing rate indicating member, a target analyzer which is adjusted in accordance with target course and speed, connections between the target analyzer on the one hand through the converting device to both the bearing rate variable speed gear and the bearing rate cursor bar on the other hand, whereby the bearing rate cursor bar is continuously adjusted according to the angular bearing rate due to movements of the target and whereby the variable speed device is adjusted so as to move the bearing rate cursor bar bodily, connections for transmitting movements from the target analyzer in accordance with rate of change of range due to target speed to the range rate cursor bar to vary the inclination thereof in accordance with the rate of change of range and also transmitting said movement to the range rate variable speed gear to vary its output speed to the range rate cursor bar thereby varying the speed at which the cursor bar is moved bodily, an indicating device co-operating with the target range rate indicating member and with the target linear bearing rate indicating member, means for adjusting said device in accordance with the movement of said members, and means for transmitting the movements of said adjusting means to the target analyzer to set the latter initially in accordance with the target course and speed indicated by said members.

14. For use in gunfire control apparatus on a ship or other moving platform, a device comprising a range rate indicator which indicates a curve of ascertained rate of change of range due to the combined movement of target ship and of own ship, a bearing rate indicator which indicates a curve of ascertained rate of change of bearing due to the combined movement of a target ship and of own ship, an analyzer which is adjusted in accordance with own ship's course and speed, a range element co-operating with the range rate indicator and actuated by the analyzer in accordance with rate of change of range due to own ship's movement, a bearing element cooperating with the bearing rate indicator and actuated by said analyzer in accordance with rate of change of bearing due to own ship's movement, means to apply additional movement to the range element and to the bearing element to bring said element into tangential relationship with said curve so that the total movement of said elements are in accordance with rate of change of range and of bearing due to the combined movement of target ship and own ship, a target range rate indicating member adjusted by the means for applying additional movement to the range element, and a target bearing rate member adjusted by the means for applying additional movement to the bearing element.

15. For use in gunfire control apparatus on a ship or other moving platform, a device comprising a range rate indicator which indicates a curve of ascertained rate of change of range which is due to the combined movement of a target ship and of own ship, a bearing rate indicator which indicates a curve of ascertained rate of change of bearing which is due to the combined movement of the target ship and of own ship, a range rate element, means to move said element in accordance with rate of change of range due to own ship movement, means to move said element in accordance with rate of change of range due to movement of the target alone, a member movable in accordance with the movement of the second mentioned means, a bearing rate element, means to move the bearing element in accordance with rate of change of bearing due to own ship alone, means to move said element in accordance with rate of change of bearing due to movement of the target ship alone, an element movable in accordance with the movement of the second mentioned means for moving the bearing rate element, said range-rate element and bearing-rate element being arranged to move at right angles to each other and to intersect so that their point of intersection indicates the target course and speed.

16. A device as in claim 13 wherein the linear bearing rate indicating member and the range rate indicating member are arranged to move relatively to each other so that the point of intersection of said members will be an indication of target course and speed, and the said means for adjusting the indicating device comprise a manually adjustable member for adjusting the indicating device rotatably and another manually adjustable member for adjusting the indicating device radially by which two manually operable members the indicating device can be brought into coincidence with the point of intersection referred to.

JOHN PERCIVAL WATSON.